US012808788B2

(12) United States Patent
Pellegrino et al.

(10) Patent No.: US 12,808,788 B2
(45) Date of Patent: Nov. 24, 2026

(54) OPTICAL SPECTROSCOPY SCANNER

(71) Applicant: Advanced Growing Resources Inc., Webster, NY (US)

(72) Inventors: Francis Pellegrino, Webster, NY (US); Heriniaina Rajaoberison, Rochester, NY (US); Andrew Thankson, Rochester, NY (US)

(73) Assignee: Advanced Growing Resources Inc., Webster, NY (US)

( * ) Notice: Subject to any disclaimer, the term of this patent is extended or adjusted under 35 U.S.C. 154(b) by 0 days.

(21) Appl. No.: 17/720,948

(22) Filed: Apr. 14, 2022

(65) Prior Publication Data

US 2022/0334053 A1 Oct. 20, 2022

Related U.S. Application Data

(60) Provisional application No. 63/174,967, filed on Apr. 14, 2021.

(51) Int. Cl.
*G01N 21/31* (2006.01)
*H04N 23/10* (2023.01)

(52) U.S. Cl.
CPC ............. *G01N 21/31* (2013.01); *H04N 23/10* (2023.01)

(58) Field of Classification Search
None
See application file for complete search history.

(56) References Cited

U.S. PATENT DOCUMENTS 5,235,465 A * 8/1993 Hayashi ................. G02B 21/02 359/659
5,394,237 A * 2/1995 Chang ....................... G01J 3/02 250/339.05
6,753,961 B1 * 6/2004 Norton .................... G01J 3/447 356/364
9,880,474 B2 * 1/2018 Patra ................... G03F 7/70191
10,739,189 B2 * 8/2020 Pacala ....................... G01J 3/46
(Continued)

FOREIGN PATENT DOCUMENTS

CN 108254072 7/2018
EP 2685304 A1 * 1/2014 ......... G02B 21/0024
JP 2010271246 A * 12/2010

OTHER PUBLICATIONS

Allen, Ashley, and S. Michael Angel. "Miniature spatial heterodyne spectrometer for remote laser induced breakdown and Raman spectroscopy using Fresnel collection optics." Spectrochimica Acta Part B: Atomic Spectroscopy 149 (2018): 91-98 (Year: 2018).*
(Continued)

*Primary Examiner* — Kara E. Geisel
*Assistant Examiner* — Roberto Fabian, Jr.
(74) *Attorney, Agent, or Firm* — Dennis B. Danella, Esq.; Woods Oviatt Gilman LLP

(57) ABSTRACT

An optical scanning apparatus is provided. An objective lens receives a reflectance spectrum from a sample. A spectral detector detects a first path of the reflectance spectrum and outputs a spectral response. An imaging detector detects a second path of the reflectance spectrum and outputs an image response. A beam splitter is located between the objective lens and each of the spectral detector and imaging detector and splits the reflectance spectrum into the first path and the second path.

23 Claims, 6 Drawing Sheets

(56) References Cited

U.S. PATENT DOCUMENTS

| | | | | |
|---|---|---|---|---|
| 2006/0282223 | A1* | 12/2006 | Lewis | A61K 31/00 702/19 |
| 2008/0068604 | A1* | 3/2008 | Grossinger | G01N 21/84 356/328 |
| 2011/0096343 | A1* | 4/2011 | Martinez | H04N 1/603 358/1.9 |
| 2011/0267616 | A1* | 11/2011 | Yang | G01J 3/02 356/326 |
| 2013/0010294 | A1* | 1/2013 | Matsuda | G01N 21/3563 356/326 |
| 2014/0078285 | A1* | 3/2014 | Mitsui | G02B 21/365 348/135 |
| 2014/0354868 | A1* | 12/2014 | Desmarais | G01J 3/0289 348/333.01 |
| 2015/0355082 | A1* | 12/2015 | Lu | G01J 3/36 356/437 |
| 2019/0017808 | A1* | 1/2019 | Kimba | B24B 37/013 |

OTHER PUBLICATIONS

Rodig, Christoph, "International Search Report and Written Opinion of the International Searching Authority", PCT International Application No. PCT/US2022/024833 filed on Apr. 14, 2022, mailed on Aug. 16, 2022, European Patent Office, Rijswijk, Netherlands (13 pages).

Luukkonen, Kirsi, "Invitation to Pay Additional Fees and, Where Applicable, Protest Fees", PCT International Application No. PCT/US2022/024833 filed on Apr. 14, 2022, mailed on Jun. 24, 2022, European Patent Office, Rijswijk, Netherlands (9 pages).

* cited by examiner

OPTICAL SPECTROSCOPY SCANNER

CROSS-REFERENCE TO RELATED APPLICATIONS

This application claims the benefit of U.S. Provisional Application No. 63/174,967, filed Apr. 14, 2021, entitled OPTICAL SPECTROSCOPY SCANNER, the entirety of which is incorporated herein by reference.

FIELD OF THE INVENTION

The present invention relates to an optical spectroscopy scanner; in particular, an optical spectroscopy scanner for providing a sample image while analyzing the UV-Vis-NIR-IR spectral regions to determine sample composition; and more particularly to a portable optical spectroscopy scanner using a combination of sensors with one sensor offering spatial resolution while the other sensor offers spectral resolution.

BACKGROUND OF THE INVENTION

Current optical scanning technology, particularly with regard to portable instruments, is generally delineated between two opposing analytical measures, namely spectral resolution versus spatial resolution. Point scanning spectroscopy is able to produce spectra with high spectral resolution. However, the tradeoff is a lack of spatial resolution. That is, the high resolution spectra are only representative of a specific point on the sample. As a result, heterogeneity of the sample is missed unless numerous point scans are taken at different locations and averaged together. This may lead to significant errors while also increasing analysis time and costs. Alternatively, hyperspectral imaging provides improved spatial resolution, but suffers from reduced spectral resolution. That is, the spectral resolution of hyperspectral imaging is dependent upon the spatial pixelization of the image and the detector's ability to interrogate the spectrum at each pixel. Thus, to increase both the spectral and spatial resolution in hyperspectral imaging requires physical real estate on the sensor. However, this optimization is a zero-sum game because, if one type of resolution increases, the other is always decreasing. One can get around this problem by having enough real estate to satisfy both resolution requirements, (i.e. by using smaller pixels) but the scaling problem is endemic to the design.

Accordingly, there is a need for optical scanner that can be used to conduct high spectral resolution chemical analysis over a large area. There is a further need to provide such an optical scanner in a portable device. The present invention addresses these, as well as other, needs.

BRIEF SUMMARY OF THE INVENTION

As will be described in more detail below, one aspect of the present invention provides an optical scanning apparatus comprising an objective lens configured to receive a reflectance spectrum from a sample, a spectral detector configured to detect a first path of the reflectance spectrum and output a spectral response, an imaging detector configured to detect a second path of the reflectance spectrum and output an image response, and a beam splitter located between the objective lens and each of the spectral detector and imaging detector, wherein the beam splitter splits the reflectance spectrum into the first path and the second path.

In a further aspect of the present invention, the optical scanning apparatus may further comprise a field stop located between the beam splitter and the spectral detector; wherein a field of view determine by the field stop is the same as the field of view of the imaging detector. A field integration element may also be located between the field stop and the spectral detector, wherein the field integration element integrates the first path of the spectral response over the field of view of the field stop to form a uniform plane of illumination which is an average of the first path of the spectral response, wherein the uniform plane of illumination is projected into the spectral detector.

In still another aspect of the present invention, the spectral detector may detect one or more of the ultraviolet (UV) spectrum, visible spectrum, near infrared spectrum (NIR) and infrared (IR).

In yet another aspect of the present invention, the optical scanning apparatus may further comprise an image display in communication with one or both of the imaging detector and the spectral detector, wherein the image display displays a visual rendering of the respective image response and/or spectral response. A wireless communication module may also be communicatively coupled to one or both of the imaging detector and the spectral detector, wherein the wireless communication module is configured to communicate the respective image response and/or spectral response to a computing device. The objective lens, beam splitter and spectral detector may be arranged along a common optical axis, and wherein the visual detector is arranged along a visual axis which is different than the common optical axis.

The present invention may further provide a method of scanning a sample, with the method comprising a) providing an optical scanning apparatus comprising an objective lens; a spectral detector; an imaging detector; and a beam splitter located between the objective lens and each of the spectral detector and imaging detector; b) receiving, via the objective lens, a reflectance spectrum of the sample; c) detecting, via the spectral detector, a first path of the reflectance spectrum; d) outputting, via the spectral detector, a spectral response; e) detecting, via the imaging detector, a second path of the reflectance spectrum; and f) outputting, via the imaging detector, an image response.

In another aspect of the present invention, the method may further comprise comparing the spectral response with standardized spectral responses stored within a database, wherein the step of comparing the spectral response includes pattern matching with the standardized spectral responses.

An additional aspect of the present invention may be directed to an optical scanning device comprising a housing, an optical scanning apparatus within the housing, a shutter actuatable between an open position and a closed position, wherein the reflectance spectrum is split by the beam splitter only when the shutter is in the open position; and a trigger to selectively actuate the shutter to the open position. The optical scanning apparatus comprises a first objective lens configured to receive a reflectance spectrum from a sample, a first spectral detector configured to detect a first path of the reflectance spectrum and output a first spectral response, an imaging detector configured to detect a second path of the reflectance spectrum and output an image response; and a beam splitter located between the first objective lens and each of the first spectral detector and imaging detector, wherein the beam splitter splits the reflectance spectrum into the first path and the second path.

In a further aspect of the present invention, the housing may be configured as a portable device. A second objective lens may be selectively interchangeable with the first objective lens while a second spectral detector may be selectively interchangeable with the first spectral detector. A first imaging detector may also be selectively interchangeable with a second imaging detector.

In still another aspect of the present invention, an image display may communicate with one or both of the imaging detector and the first spectral detector, wherein the image display displays a visual rendering of the respective image response and/or first spectral response. A wireless communication module may also be communicatively coupled to one or both of the imaging detector and the first spectral detector, wherein the wireless communication module is configured to communicate the respective image response and/or first spectral response to a computing device. The computing device may be remotely located from the housing.

Additional objects, advantages and novel features of the present invention will be set forth in part in the description which follows, and will in part become apparent to those in the practice of the invention, when considered with the attached figures.

BRIEF DESCRIPTION OF THE DRAWINGS

The accompanying drawings form a part of this specification and are to be read in conjunction therewith, wherein like reference numerals are employed to indicate like parts in the various views, and wherein.

DETAILED DESCRIPTION OF THE INVENTION

Figure 1:
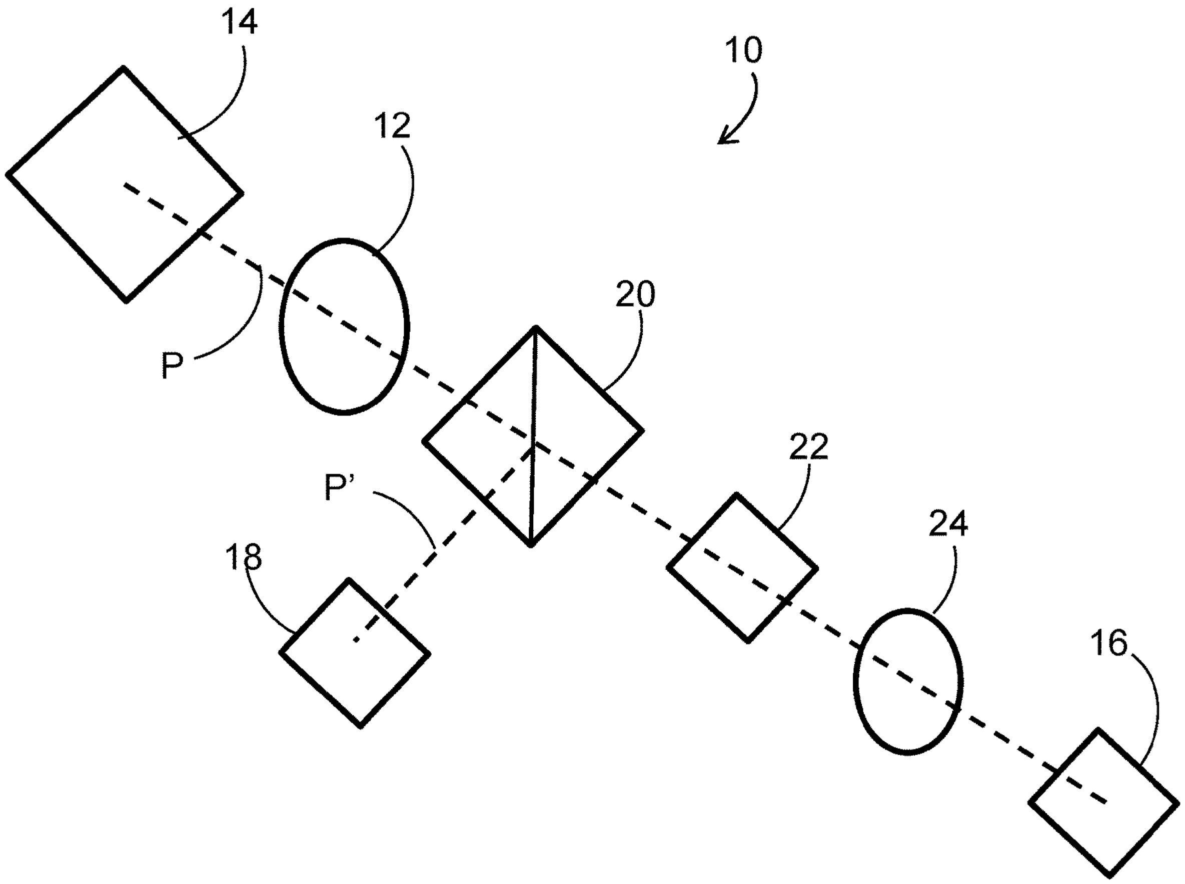
FIG. 1 is a schematic of an exemplary optical scanning apparatus in accordance with the present invention.
Figure 2:
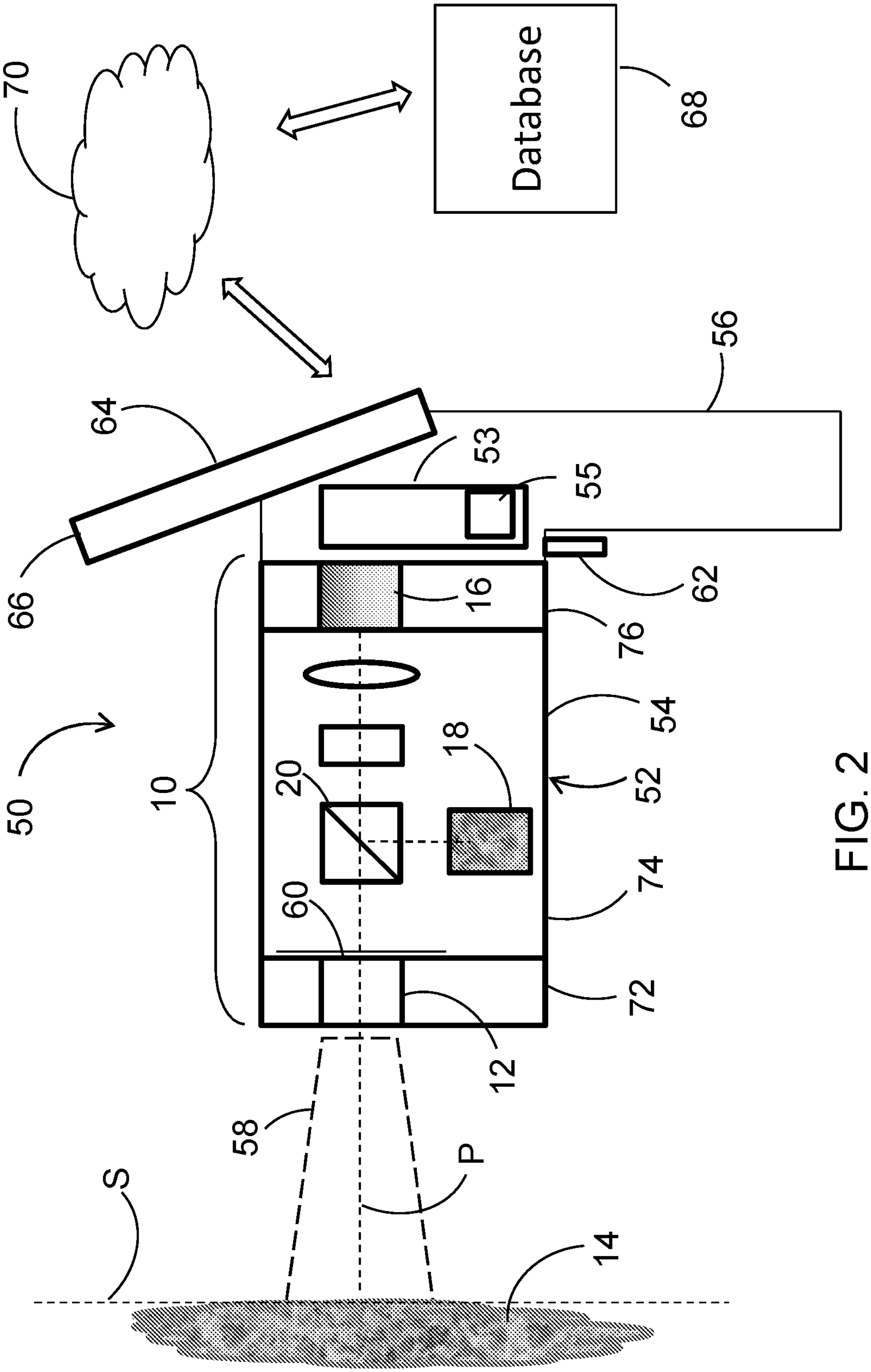
FIG. 2 is a schematic of an embodiment of an exemplary optical scanning device employing the optical scanning apparatus shown in FIG. 1.
Figure 3:
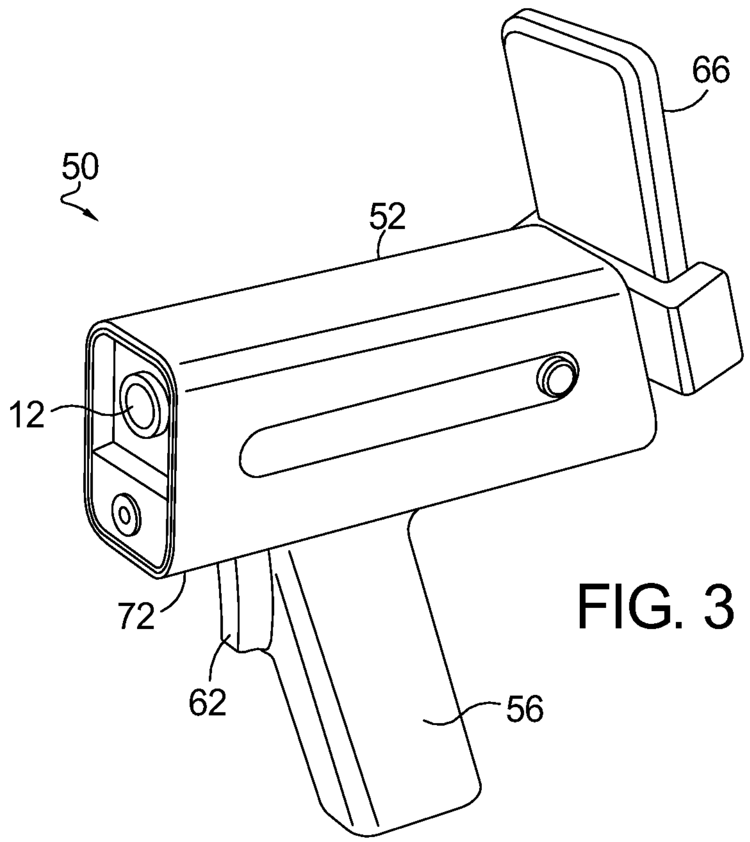
FIG. 3 is a side perspective view of a rendering of an alternative exemplary optical scanning apparatus in accordance with the present invention.
Figure 4:
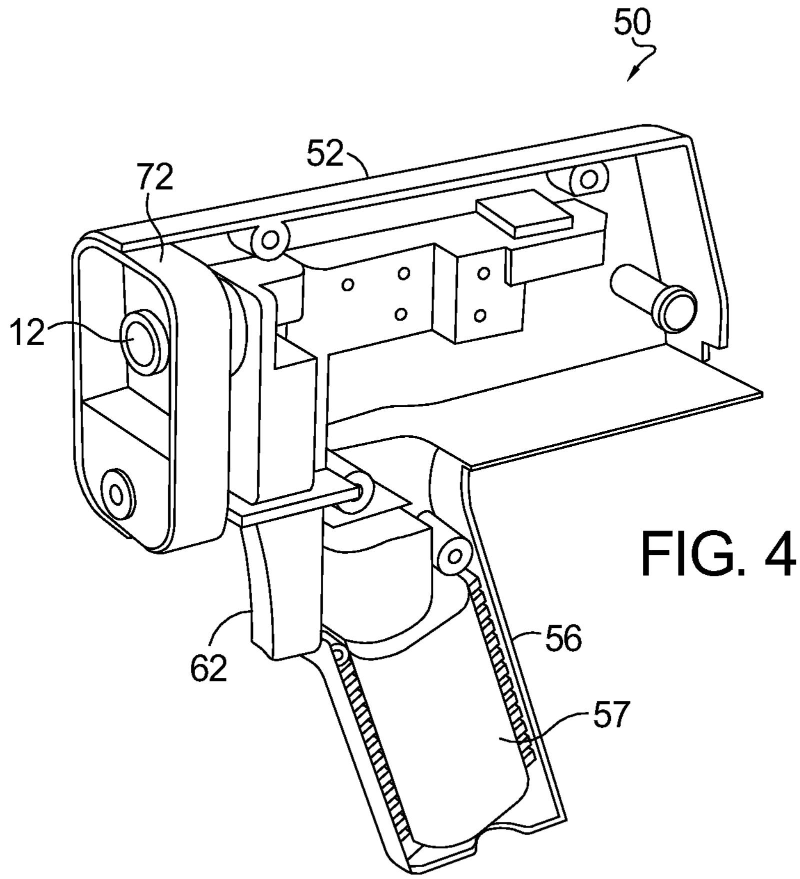
FIG. 4 is a cross section rendering of the exemplary optical scanning apparatus of FIG. 3 taken generally along line 4-4 as shown in FIG. 3.
Figure 5:
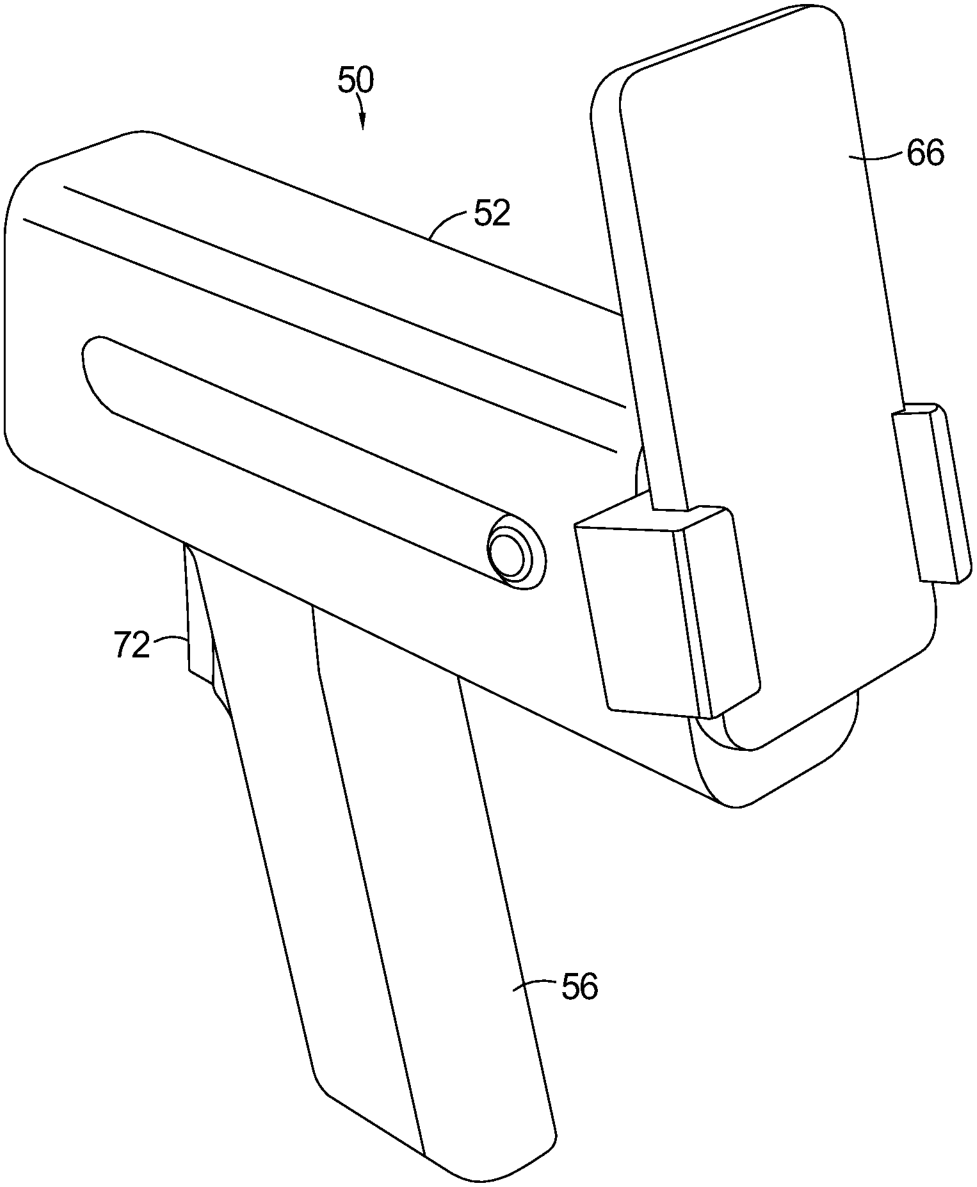
FIG. 5 is a rear perspective rendering of the exemplary optical scanning apparatus shown in FIG. 3 and including a mobile computing device in accordance with the present invention.

Referring to the drawings in detail, and specifically to FIG. 1, an exemplary embodiment of an optical scanning apparatus in accordance with the present invention is generally indicated by reference numeral 10. Optical scanning apparatus 10 includes an objective lens 12 which is configured to receive a reflectance spectrum from sample 14. The reflectance spectrum comprises the wavelengths of light reflected off of sample 14 when exposed to incident light. The reflectance spectrum is not solely limited to wavelengths within the visible spectrum (about 400 nm to about 750 nm), but may also include wavelengths within the ultraviolet (UV) spectrum (about 10 nm to about 400 nm) near infrared (NIR) spectrum (about 750 nm to about 2500 nm) and infrared (IR) spectrum (about 2500 nm to about 25 μm). It should be noted that, while the below description refers to reflectance spectra, other spectra may be interrogated, such as but not limited to transmission and/or emission spectra and that such other spectral modalities are to be considered within the teachings of the present invention.

In accordance with an aspect of the present invention, optical scanning apparatus 10 is configured as a dual detector system. As can be seen in FIG. 1, a first detector is a spectral detector 16 while a second detector includes an imaging detector 18. A beam splitter 20, such as but not limited to a plate, cube, pellicle beam or dichroic splitter, is located along optical path P and divides the reflectance spectrum received from objective lens 12, either in its entirety or via spectral division, into two distinct paths, with one path continuing along optical path P and the other path P' being directed to imaging detector 18. Path P' may lie along any arbitrary angle with respect to path P, but in one embodiment path P' is orthogonal to path P (i.e., at 90 degrees).

One or more field stops 22 (collectively "field stop 22") may be positioned along optical path P after beam splitter 20 to obstruct the field of view of spectral detector 16. In one aspect of the present invention, the dimensions of field stop 22 are the same as, or approximately the same as, the dimensions of the field of view of imaging detector 18. The spectrum passing through field stop 22 may then enter a field integration element 24, such as but not limited to a Kohler illumination lens or lenslet array, diffuser or mixing rod. In a further aspect, field stop 22 may be subdividable to enable either spectral detector 16, or spectral and imaging detectors 16 and 18, to sample a subset of the full field of view from objective lens 12. Field integration element 24 may then integrate the spectrum to form a uniform plane of illumination that represents the average of the entire spectrum reflected and/or transmitted by the sample within the field of view defined by field stop 22. The uniform plane of illumination is then projected into spectral detector 16.

Turning now to FIGS. 2-5, an exemplary optical scanning device 50 including an embodiment of an optical scanning apparatus 10 is shown. In the exemplary optical scanning device 50, optical scanning apparatus 10 is positioned within a housing 52. Housing 52 may take any suitable form depending upon intended use of optical scanning apparatus 10. By way of example and without limitation thereto, the housing may be mounted onto a gantry system (not shown) and may be configured to analyze production samples for quality control purposes. Or, as shown generally in FIGS. 2-5, housing 52 may be constructed as a portable device intended to be used by an operator in the field.

In the exemplary embodiment shown in FIGS. 2-5, the portable optical scanning device 50 may include a head portion 54 which includes the optical scanning apparatus 10 and a handle portion 56 configured to be gripped by the operator during use. The portable optical scanning device 50 may then be manually positioned such that objective lens 12 is oriented toward the sample 14. In accordance with an aspect of the present invention, portable optical scanning device 50 is positioned such that the plane S defined by the sample is substantially perpendicular to the optical pathway P of optical scanning apparatus 10. In this manner, the reflectance spectrum of sample 14 is scanned over the full field of view 58 of objective lens 12. To selectively control input of the reflectance spectrum, optical scanning apparatus 10 may further include a shutter 60 located between objective lens 12 and beam splitter 20. A reflectance spectrum is only received by the spectral detector 16 and imaging detector 18 when shutter 60 is in an open position. Spectral detector 16 may further sample the ambient light spectrum when shutter 60 is in the open position. In one aspect of the invention, the ambient light is sampled by the spectral detector along an axis of the beam splitter that differs from the objective lens. Shutter 60 is normally in a closed position. Opening of shutter 60 may be selectively controlled by the operator, such as by actuation of a trigger 62.

Portable optical scanning device 50 may also be equipped with additional, optional functionalities. By way of example and without limitation thereto, portable optical scanning device 50 may include a display 64 communicatively coupled to the spectral detector 16 and imaging detector 18 so as to visually display the respective spectral response and image response. Display 64 may be an integral component to housing 52 or may be removably mounted onto housing 52. Power may be provided via a battery 57 stored within housing 52, such as within handle portion 56. See FIG. 4.

Figure 6:
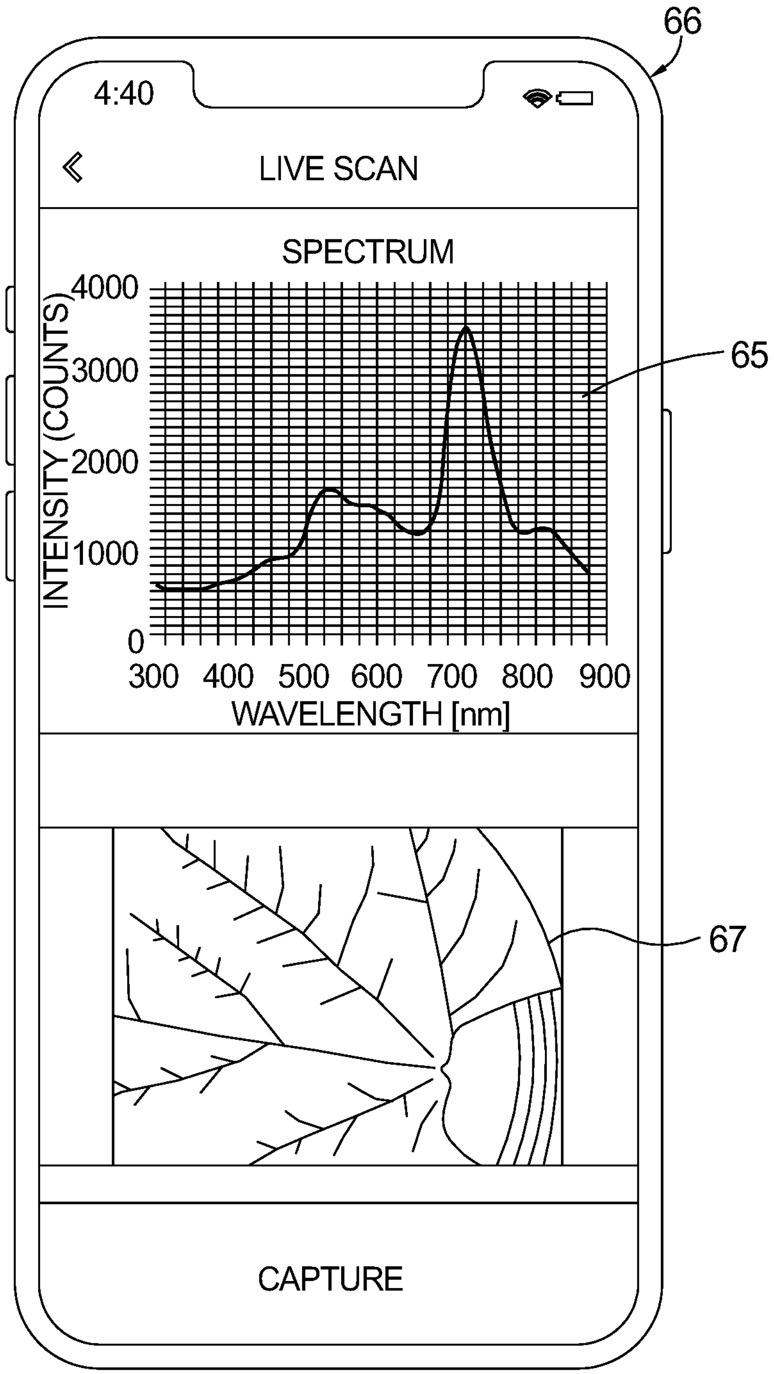
FIG. 6 is an exemplary screenshot of the user interface of the mobile computing device shown in FIG. 5 showing an image and an associated spectrum thereof.
Figure 7:
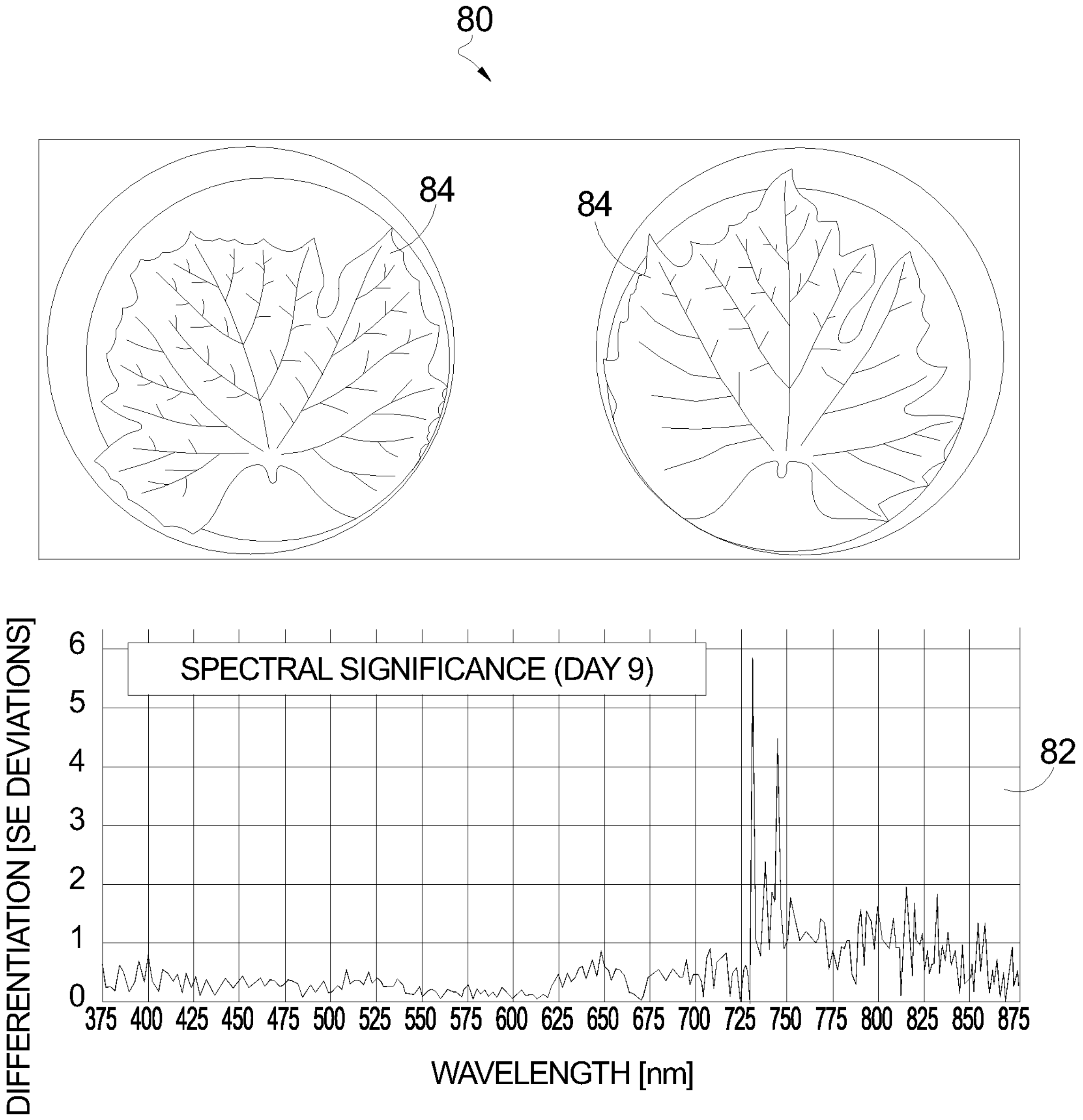
FIG. 7 shows an analytical plot [bottom], generated from data collected from grape leaves [top] using an exemplary optical scanner in accordance with the present invention.

In accordance with an aspect of the present invention, display 64 may comprise a smartphone or other smart (wirelessly communicative) electronic device 66. See FIGS. 3 and 5. Housing 52 may include an onboard circuit board 53 including a processor and memory, as well as suitable communication software/hardware 55, such as Bluetooth or other similar technology, to promote communication and display of the spectral response 65 and image response 67 from spectral detector 16 and imaging detector 18 to the smart device 66 or one or more databases 68 over internet 70. See FIG. 6. The smart device 66 may include a corresponding hardware/software application to facilitate communication of the device data and for conducting subsequent data analysis 80 of the spectral and image responses. By way of example, as shown in FIG. 7, analytical plot 82 [bottom] shows the detection of the fungal disease powdery mildew on grape leaves 84 [top] with 99.999% precision (equivalent to the separation of 6 standard error [SE] deviations, or 6σ, in the plot).

By way of example and without limitation thereto, smart device 66 may wirelessly communicate with one or more databases 68 over the internet 70 wherein databases 68 may include spectral indexes for many possible target analytes. Smart device 66 may compare the spectral response measured by the spectral detector 16 with the reference spectra stored within databases 68. Spectral interrogation, such as through spectral matching, may assist the operator in interpreting the results of the spectral response. Similarly, smart device 66 may perform image analysis by, for example, comparing the image response gathered by the imaging detector 18 with reference images stored within databases 68.

In accordance with another aspect of the present invention, portable optical scanning device 50 may be configured as a modular device promoting interchangeability of various components comprising the device 50. In one aspect, objective lens 12 may be mounted within a lens housing 72 which is removably attachable to center housing 74. An alternative objective lens may also be mounted within a respective lens housing. In this manner, objective lens 12 may be swapped with the alternative lens without requiring disassembly of center housing 74 or any of the system components mounted therein (e.g., beam splitter 20, field stop 22, field integration element 24, shutter 60 and imaging detector 18). Similarly, spectral detector 16 may also be mounted within a spectral detector housing 76 which is configured to be swappable with an alternative spectral detector/spectral detector housing. Imaging detector 18 may also be mounted within an imaging detector housing 18' which is also configured to be swappable with an alternative imaging detector/imaging detector housing.

From the foregoing, it will be seen that this invention is one well adapted to attain all the ends and objects hereinabove set forth together with other advantages which are obvious and which are inherent to the device described herein. It will be understood that certain features and sub combinations are of utility and may be employed without reference to other features and sub combinations. This is contemplated by and is within the scope of the claims. Since many possible embodiments of the invention may be made without departing from the scope thereof, it is also to be understood that all matters herein set forth or shown in the accompanying drawings are to be interpreted as illustrative and not limiting.

The constructions described above and illustrated in the drawings are presented by way of example only and are not intended to limit the concepts and principles of the present invention. As used herein, the terms "having" and/or "including" and other terms of inclusion are terms indicative of inclusion rather than requirement. Further, it should be understood that the use of the terms "module" and "component" herein are interchangeable and shall have the same meaning.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

What is claimed is:

1. An optical scanning apparatus comprising:

a) an objective lens configured to receive a reflectance spectrum from a sample;

b) a spectral detector configured to detect a first path of the reflectance spectrum and output a spectral response;

c) an imaging detector configured to detect a second path of the reflectance spectrum and output an image response;

d) a beam splitter located between the objective lens and the corresponding spectral detector and imaging detector, wherein the beam splitter splits the reflectance spectrum into the first path and the second path; and e) a subdividable field stop positioned between the beam splitter and the spectral detector to produce a subdivided field of view for the spectral detector, wherein the subdivided field of view of the spectral detector has dimensions that are less than or equal to dimensions of a field of view of the imaging detector, wherein the spectral detector is configured to analyze the reflectance spectrum of all or a subset of the subdivided field of view.

2. The optical scanning apparatus in accordance with claim 1 further comprising a field integration element located between the field stop and the spectral detector, wherein the field integration element integrates the first path of the spectral response for each subdivision of the subdivided field of view to form a uniform plane of illumination which is an average of the first path of the spectral response, wherein the uniform plane of illumination is projected into the spectral detector.

3. The optical scanning apparatus in accordance with claim 2 wherein the field integration element is a Kohler illumination lens or an integrating rod.

4. The optical scanning apparatus in accordance with claim 1 wherein the spectral detector detects one or more of the ultraviolet (UV) spectrum, visible spectrum, near infrared (NIR) spectrum, and infrared (IR) spectrum.

5. The optical scanning apparatus in accordance with claim 1 wherein the imaging detector detects one or more of the ultraviolet (UV) spectrum, visible spectrum, near infrared (NIR) spectrum and infrared (IR) spectrum.

6. The optical scanning apparatus in accordance with claim 1 further comprising an image display in communication with one or both of the imaging detector and the spectral detector, wherein the image display displays a visual rendering of the respective image response and/or spectral response.

7. The optical scanning apparatus in accordance with claim 1 further comprising a wireless communication module communicatively coupled to one or both of the imaging detector and the spectral detector, wherein the wireless communication module is configured to communicate the respective image response and/or spectral response to a computing device.

8. The optical scanning apparatus in accordance with claim 1 wherein the objective lens and the beam splitter are arranged along a common axis, wherein the imaging detector or the spectral detector is arranged along the common axis, and wherein the other of the imaging detector and the spectral detector is arranged along a second axis which is different than the common axis.

9. The optical scanning apparatus in accordance with claim 1 wherein ambient light not coming from the sample is sampled by the spectral detector along an axis of the beam splitter that differs from the objective lens.

10. The optical scanning apparatus in accordance with claim 1 wherein the beam splitter is a dichroic divider configured to split the reflectance spectrum in a first set of wavelengths along the first path and a second set of wavelengths along the second path, and wherein the first set of wavelengths is different than the second set of wavelengths.

11. A method of scanning a sample, the method comprising:

a) providing an optical scanning apparatus comprising an objective lens; a spectral detector; an imaging detector; a beam splitter located between the objective lens and the corresponding spectral detector and imaging detector; a subdividable field stop positioned between the beam splitter and the spectral detector to produce a subdivided field of view for the spectral detector, wherein the subdivided field of view of the spectral detector has dimensions that are less than or equal to dimensions of a field of view of the imaging detector, wherein the spectral detector is configured to analyze the reflectance spectrum of all or a subset of the subdivided field of view;

b) receiving, via the objective lens, a reflectance spectrum of the sample;

c) detecting, via the spectral detector, a first path of the reflectance spectrum;

d) outputting, via the spectral detector, a spectral response;

e) detecting, via the imaging detector, a second path of the reflectance spectrum; and f) outputting, via the imaging detector, an image response.

12. The method in accordance with claim 11 further comprising:

comparing the spectral response with standardized spectral responses stored within a database.

13. The method in accordance with claim 12 wherein the step of comparing the spectral response includes pattern matching with the standardized spectral responses.

14. An optical scanning device comprising:

a) a housing;

b) an optical scanning apparatus within the housing, the optical scanning apparatus comprising:

i) a first objective lens configured to receive a reflectance spectrum from a sample;

ii) a first spectral detector configured to detect a first path of the reflectance spectrum and output a first spectral response;

a first imaging detector configured to detect a second path of the reflectance spectrum and output an image response;

iv) a beam splitter located between the first objective lens and each of the first spectral detector and imaging detector, wherein the beam splitter splits the reflectance spectrum into the first path and the second path; and v) a subdividable field stop positioned between the beam splitter and the spectral detector to produce a subdivided field of view for the spectral detector, wherein the subdivided field of view of the spectral detector has dimensions that are less than or equal to dimensions of a field of view of the imaging detector, wherein the spectral detector is configured to analyze the reflectance spectrum of all or a subset of the subdivided field of view;

c) a shutter actuatable between an open position and a closed position, wherein the reflectance spectrum is split by the beam splitter only when the shutter is in the open position; and d) a trigger to selectively actuate the shutter to the open position.

15. The optical scanning device in accordance with claim 14 wherein ambient light spectrum is directed to the spectral detector only when the shutter is in the open position.

16. The optical scanning device in accordance with claim 14 wherein the housing is configured as a portable device.

17. The optical scanning device in accordance with claim 14 further comprising an additional objective lens which is selectively interchangeable with the first objective lens.

18. The optical scanning device in accordance with claim 14 further comprising an additional spectral detector which is selectively interchangeable with the first spectral detector.

19. The optical scanning device in accordance with claim 14 further comprising an additional imaging detector which is selectively interchangeable with the first imaging detector.

20. The optical scanning device in accordance with claim 14 further comprising an image display in communication with one or both of the first imaging detector and the first spectral detector, wherein the image display displays a visual rendering of the respective image response and/or first spectral response.

21. The optical scanning device in accordance with claim 14 further comprising a wireless communication module communicatively coupled to one or both of the first imaging detector and the first spectral detector, wherein the wireless communication module is configured to communicate the respective image response and/or first spectral response to a computing device.

22. The optical scanning device in accordance with claim 21 wherein the computing device is remotely located from the housing.

23. The optical scanning apparatus in accordance with claim 10 wherein the first set of wavelengths includes one or more of the ultraviolet (UV) spectrum, near infrared (NIR) spectrum, and infrared (IR) spectrum, and wherein the second set of wavelengths includes the visible spectrum.

* * * * *